(12) United States Patent
Lee et al.

(10) Patent No.: US 7,830,356 B2
(45) Date of Patent: Nov. 9, 2010

(54) SURFACE LIGHT SOURCE USING LED AND BACKLIGHT UNIT HAVING THE SURFACE LIGHT SOURCE

(75) Inventors: Sang Yun Lee, Kyungki-do (KR); Jae Wook Kwon, Seoul (KR)

(73) Assignee: Samsung LED Co., Ltd., Suwon (KR)

( * ) Notice: Subject to any disclaimer, the term of this patent is extended or adjusted under 35 U.S.C. 154(b) by 776 days.

(21) Appl. No.: 11/485,426

(22) Filed: Jul. 13, 2006

(65) Prior Publication Data

US 2007/0013647 A1    Jan. 18, 2007

(30) Foreign Application Priority Data

Jul. 15, 2005    (KR) ...................... 10-2005-0064204

(51) Int. Cl.
G09G 3/36    (2006.01)
(52) U.S. Cl. .................. 345/102; 315/291; 358/41; 358/44
(58) Field of Classification Search ................. 345/102; 315/291; 358/41, 44
See application file for complete search history.

(56) References Cited

U.S. PATENT DOCUMENTS

| | | | |
|---|---|---|---|
| 4,500,914 A * | 2/1985 | Watanabe et al. | 348/280 |
| 5,552,800 A * | 9/1996 | Uchikoga et al. | 345/89 |
| 6,614,471 B1 * | 9/2003 | Ott | 348/238 |
| 7,012,382 B2 * | 3/2006 | Cheang et al. | 315/291 |
| 7,081,920 B2 * | 7/2006 | Sugiki | 348/223.1 |
| 7,204,607 B2 | 4/2007 | Yano et al. | |
| 7,372,525 B2 * | 5/2008 | Liu | 349/106 |
| 7,468,723 B1 * | 12/2008 | Collins | 345/102 |
| 2002/0025157 A1 | 2/2002 | Kawakami | |
| 2003/0076056 A1 * | 4/2003 | Schuurmans | 315/291 |
| 2003/0132700 A1 * | 7/2003 | Ven | 313/500 |
| 2003/0189829 A1 | 10/2003 | Shimizu et al. | |

(Continued)

FOREIGN PATENT DOCUMENTS

JP    01-081686    5/1989

(Continued)

OTHER PUBLICATIONS

Notice of Office Action dated Sep. 7, 2010, issued by the Japan Patent Office in counterpart Japanese Patent Application No. 2006-193127.

*Primary Examiner*—Bipin Shalwala
*Assistant Examiner*—Afroza Y Chowdhury
(74) *Attorney, Agent, or Firm*—Sughrue Mion, PLLC

(57) ABSTRACT

A surface light source using LEDs is provided. The surface light source includes a substrate having a plurality of divided regions, a plurality of red, green and blue LEDs arranged on each divided region in a predetermined arrangement structure, and a plurality of LED driving units each having red, green and blue LED driving circuits for respectively driving the red, green and blue LEDs. Identical color LEDs in each divided region are interconnected in series. The series connections of the red, green and blue LEDs in one divided region are respectively connected to the series connections of the red, green and blue LEDs in one or more other divided regions in parallel. The parallel connections of the series connections are connected to corresponding color LED driving circuits.

10 Claims, 5 Drawing Sheets

U.S. PATENT DOCUMENTS

| | | | |
|---|---|---|---|
| 2003/0230991 A1* | 12/2003 | Muthu et al. | 315/307 |
| 2005/0224822 A1* | 10/2005 | Liu | 257/84 |
| 2005/0286264 A1* | 12/2005 | Kim et al. | 362/600 |
| 2006/0193132 A1* | 8/2006 | Kim et al. | 362/231 |
| 2006/0232969 A1 | 10/2006 | Bogner et al. | |
| 2006/0256049 A1 | 11/2006 | Schou | |
| 2007/0008740 A1* | 1/2007 | Lee et al. | 362/612 |
| 2007/0103054 A1* | 5/2007 | Chung et al. | 313/498 |
| 2007/0200121 A1* | 8/2007 | Lankhorst et al. | 257/79 |
| 2007/0236447 A1* | 10/2007 | Lee et al. | 345/102 |
| 2009/0141481 A1* | 6/2009 | Park et al. | 362/97.3 |

FOREIGN PATENT DOCUMENTS

| | | | |
|---|---|---|---|
| JP | 03-278023 A | | 12/1991 |
| JP | 04-079454 | | 7/1992 |
| JP | 09-146469 | | 6/1997 |
| JP | 11-003051 | | 1/1999 |
| JP | 2002-082654 A | | 3/2002 |
| JP | 2002-116481 | | 4/2002 |
| JP | 2002-352968 | | 12/2002 |
| JP | 2003-050569 A | | 2/2003 |
| JP | 2003-100126 | | 4/2003 |
| JP | 2003-124528 | | 4/2003 |
| JP | 2005-117028 | | 4/2005 |
| JP | 2006-526886 | | 11/2006 |
| KR | 10-2005-0022702 A | | 3/2005 |
| KR | 10-2005-0045794 | * | 5/2005 |
| WO | WO 2004/031844 A1 | | 4/2004 |

* cited by examiner

SURFACE LIGHT SOURCE USING LED AND BACKLIGHT UNIT HAVING THE SURFACE LIGHT SOURCE

RELATED APPLICATION

The present application is based on, and claims priority from, Korean Application Number 2005-64204, filed on Jul. 15, 2005, the disclosure of which is hereby incorporated by reference herein in its entirety.

BACKGROUND OF THE INVENTION

1. Field of the Invention

The present invention relates to a surface light source using light emitting diodes (LEDs), and more particularly, to a surface light source that can solve the problems, which may be caused by the increase of a driving voltage and current, by electrically interconnecting a plurality of LEDs using the combination of a series connection and a parallel connection and a backlight unit for a liquid crystal display (LCD), which has the surface light source.

2. Description of the Related Art

A cold cathode fluorescent lamp (CCFL) is widely used as a light source of a conventional backlight for an LCD. Since the CCFL uses mercury gas, it may cause the environmental pollution. Furthermore, the CCFL has a relatively slow response time and a relatively low color reproduction. In addition, the CCFL is not proper to reduce the weight, thickness and overall volume of an LCD panel to which it is applied.

However, LEDs are eco-oriented and have a response time of several nano seconds, thereby being effect for a video signal stream and enabling an impulsive driving. Furthermore, the LEDs have 100% color reproduction and can properly vary luminance and color temperature by adjusting a quantity of light emitted from red, green and blue LEDs. In addition, the LEDs are proper to reduce the weight, thickness and overall volume of the LCD panel. Therefore, in recent years, they have been widely used as a light source of a backlight unit for the LCD.

The LCD backlight employing the LEDs can be classified into an edge type backlight and a direct type backlight according to positions of the light source. In the edge type backlight, the light source is positioned at a side and emits light toward a front surface of the LCD panel using a light guide plate. In the direct type backlight, the light source is a surface light source placed under the LCD panel and having a surface area almost identical to that of the LCD panel and directly emits light toward the front surface of the LCD panel.

FIG. 1 shows a conventional surface light source used in a backlight unit of a direct type LCD panel. As shown in FIG. 1, a conventional surface light source used in a direction type LCD panel includes bar-shaped substrates 110. A plurality of red, green and blue LEDs are arranged on each of the bar-shaped substrate 110. The bar-shaped substrates 110 are arrayed in a direction. That is, the plurality of red, green and blue LEDs 121, 122 and 123 are arranged on each of the bar-shaped substrates 110, in which the identical color LEDs are interconnected in series and directly connected to a corresponding color LED driving circuit 221, 222, or 223 of an LED driving unit 22. In the conventional surface light source, one LED driving unit 22 is required for each bar-shaped substrate. In addition, each LED driving unit 22 requires three different driving circuits 121, 122 and 123.

In the LED connection structure of the conventional surface light source, the LEDs are interconnected in series in each driving circuit. However, when the large number of LEDs is interconnected in series, a very high driving voltage is necessary.

However, since the increase of the driving voltage or driving current is limited due to a structural limitation of an integrate circuit used in the driving circuit or other design limitations, it is impossible to apply the conventional LED connection structure to a surface light source using the large number of LEDs.

SUMMARY OF THE INVENTION

Accordingly, the present invention is directed to a surface light source and a backlight unit having the surface light source that substantially obviate one or more problems due to limitations and disadvantages of the related art.

An object of the present invention is to provide a surface light source that can drive a plurality of LEDs using a proper driving voltage or current by electrically interconnecting a plurality of LEDs using the combination of a series connection and a parallel connection.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a surface light source using LEDs, including: a substrate having a plurality of divided regions; a plurality of red, green and blue LEDs arranged on each divided region in a predetermined arrangement structure; and a plurality of LED driving units each having red, green and blue LED driving circuits for respectively driving the red, green and blue LEDs, wherein identical color LEDs on each divided region are interconnected in series, the series connections of the red, green and blue LEDs in one divided region are respectively connected to the series connections of the red, green and blue LEDs in one or more other divided regions in parallel, and the parallel connections of the series connections are connected to corresponding color LED driving circuits.

The substrate may be divided such that the arrangement of the divided regions becomes nX2 or 2Xn (n is a natural number greater than 2).

The numbers of the red, green and blue LEDs in one divided region may be identical to those of the red, green and blue LEDs in other divided regions.

The series connections of the red, green and blue LEDs in one divided region may be respectively connected to the series connections of the red, green and blue LEDs in an adjacent divided region in parallel.

Each of the LED driving unit may drive the LEDs arranged in two adjacent divided regions.

The predetermined arrangement structure may include: a first LED arrangement where red, blue, green, and green LEDs are repeatedly arranged in this order; and a second LED arrangement where blue, red, green, and green LEDs are repeatedly arranged in this order, wherein additional first and second LED arrangements on each of which a predetermined LED arrangement where one red LED, one blue LED and two green LEDs are arranged in a predetermined order is repeated are repeatedly arranged along rows.

According to another aspect of the present invention, there is provided a backlight unit attached on an LCD panel, including: a surface light source according to any one of claims 1 through 6; a diffuser sheet provided at a LCD panel side of the surface light source to uniformly diffuse incident light from the surface light source; and at least one light collection sheet provided at an LCD panel side of the diffuser sheet to collecting diffused light from the diffuser sheet in a direction normal to a plan of the LCD panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
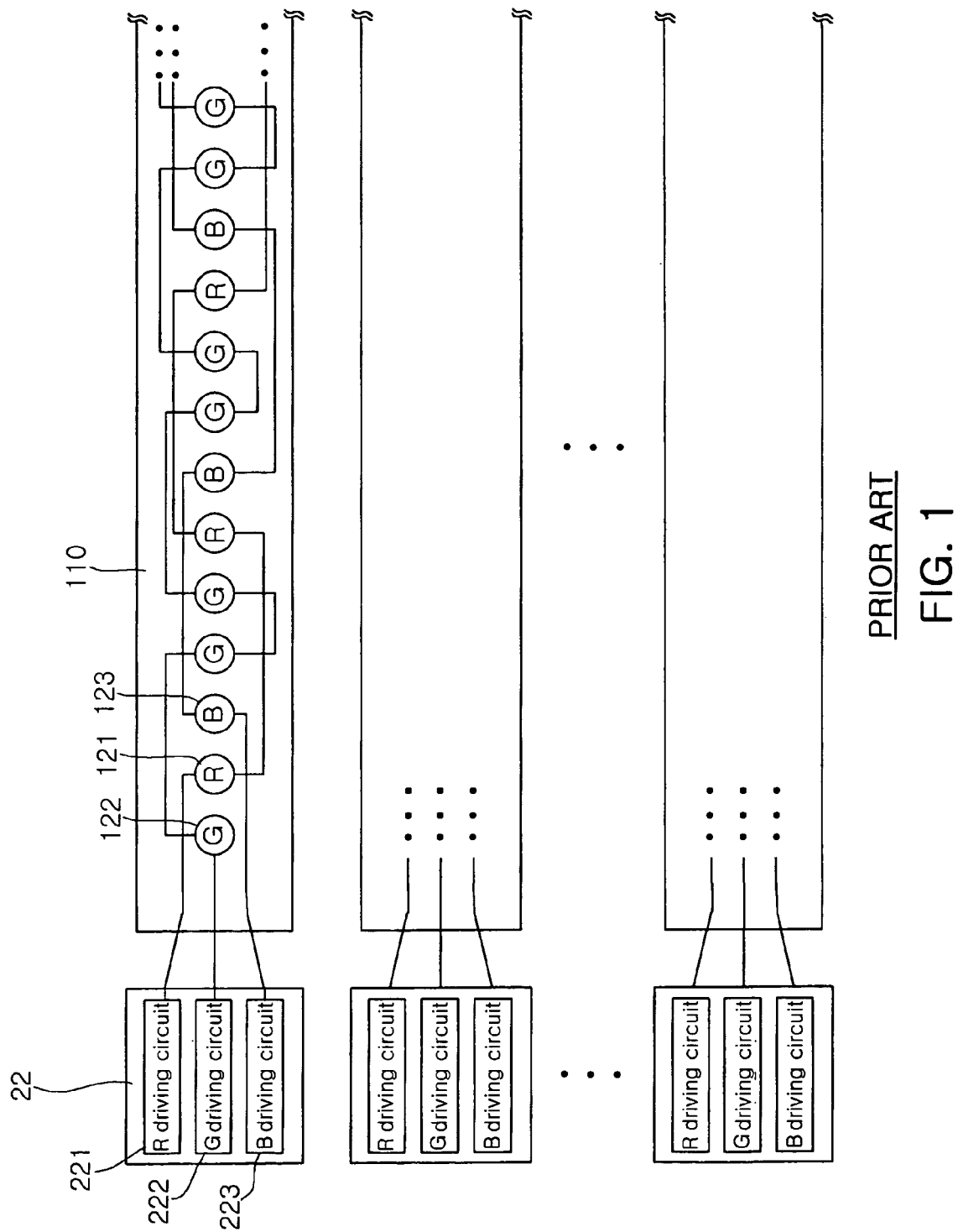
FIG. 1 is a schematic view of a conventional surface light source using LEDs.

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be through and complete, and will fully convey he concept of the invention to those skilled in the art. In the drawings, the shape and size of each part may be exaggerated for clarity. Wherever possible, the same reference numbers will be used throughout the drawings to refer to the same or like parts.

Figure 2:
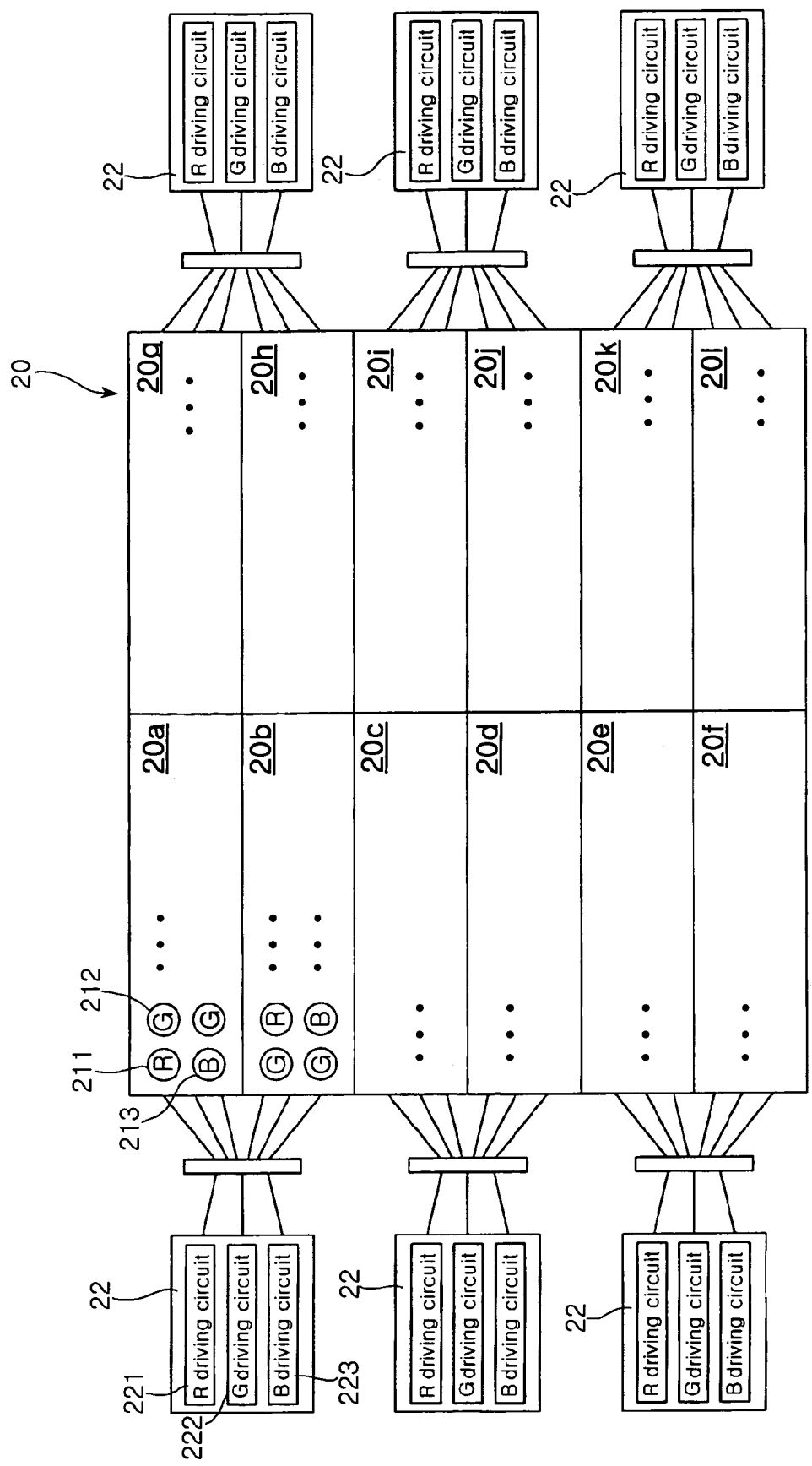
FIG. 2 is a schematic view of a surface light source using LEDs according to an embodiment of the present invention.

FIG. 2 is a schematic view of a surface light source using LEDs according to an embodiment of the present invention. Referring to FIG. 2, a surface light source using LEDs according to an embodiment of the present invention includes a substrate 20 having a plurality of divided regions 20a through 20l, a plurality of red, green and blue LEDs 211, 212 and 213 arranged on the substrate 20, and a plurality of LED driving units 22 each having red, green and blue LED driving circuits 222 for respectively driving the red, green and blue LEDs 211, 212 and 213.

The substrate 20 may be formed of a metal core printed circuit board (MCPCB) that has been used in the conventional surface light source using the LEDs. The MCPCB includes a core formed of metal such as Al and insulation plates formed on top and bottom surfaces of the core. The MCPCB has an advantage of effectively dissipating heat when many LEDs emitting a large amount of heat are mounted.

As described above, the substrate 20 is divided into the divided regions 20a through 20l. The divided regions 20a through 20l becomes references by which the electric connection structures between the red, green and blue LEDs 211, 212 and 213 are divided. That is, the red, green and blue LEDs 211, 212 and 213 are arranged on the divided region, in which identical color LEDs are interconnected in series.

The substrate 20 is divided in a variety of patterns. However, considering the electron connection of the LEDs to the LED driving units 22, it is preferable that the substrate 20 is divided such that the arrangement of the divided regions becomes nX2 or 2Xn (n is a natural number greater than 2). For example, when the arrangement of the divided regions becomes nX3, since there are divided regions that cannot be positioned at an edge of the substrate, it is difficult to electrically connect the LEDs 211, 212 and 213 arranged on the divided regions that are not positioned at the edge of the substrate to the driving units 22.

Figure 3:
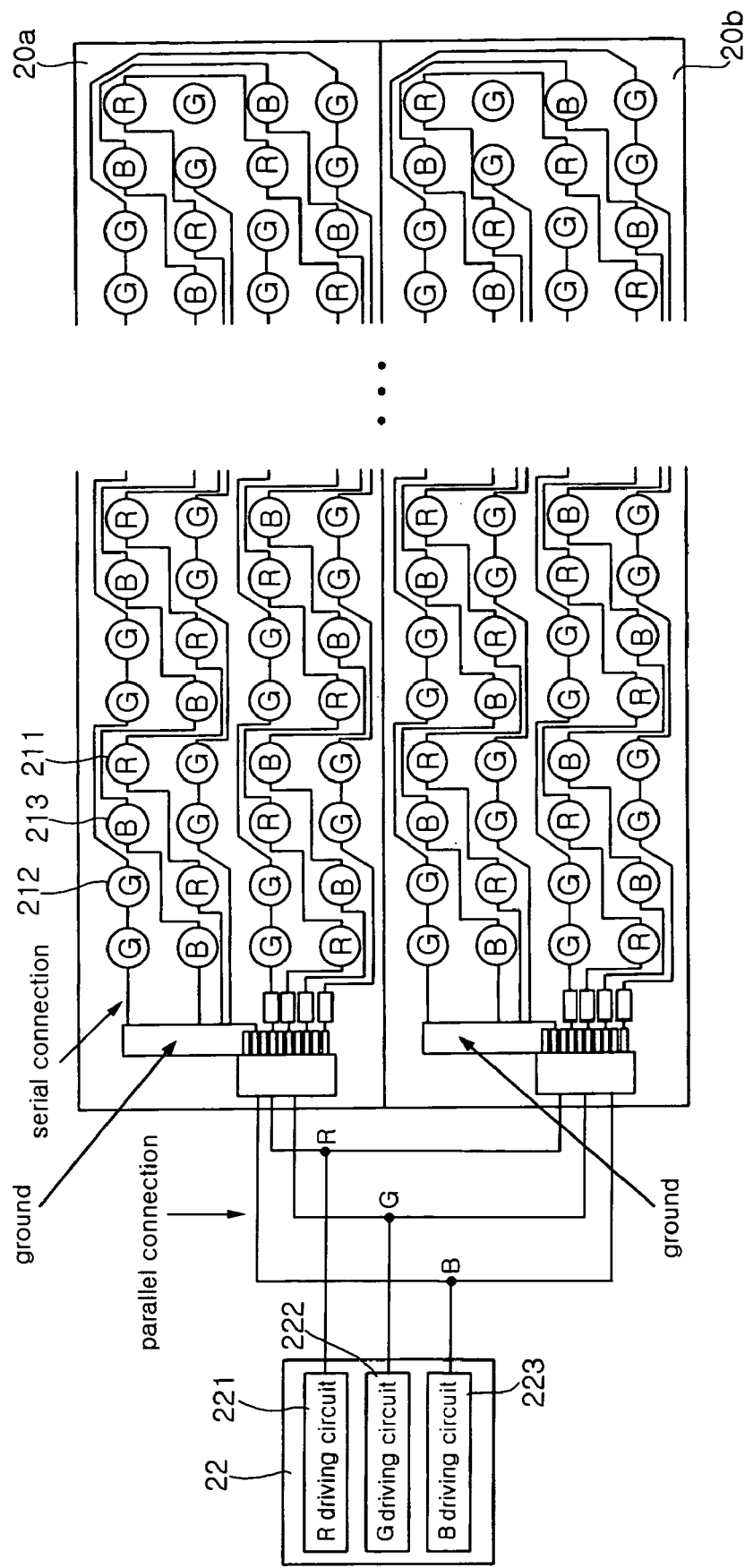
FIG. 3 is an enlarged view of a part of the surface light source of FIG. 2.

The connection structure of the LEDs will be described with reference to FIG. 3. FIG. 3 is an enlarged view of a part of the surface light source of FIG. 2. That is, FIG. 3 is an enlarged view of the divided regions 20a and 20b of FIG. 2.

Referring to FIG. 3, as described above, the red, green and blue LEDs 211, 212 and 213 are arranged on each of the divided regions 20a and 20b, in which the identical color LEDs are interconnected in series. The series connection structure of the identical color LEDs in one of the divided regions 20a and 20b is connected to the series connection structure of the identical color LEDs in the other of the divided regions 20a and 20b in parallel. The parallel connection structure is electrically connected to the corresponding color LED driving circuit 221, 222 or 223. For example, as shown in FIG. 3, on the divided region 20a, the identical color LEDs are interconnected in series between a terminal for the connection to the driving circuit 221, 222 or 223 and a ground. The LEDs arranged in the divided region 20b has an identical connection structure to that of the LEDs arranged in the divided region 20a. The series connection structure of same color LEDs arranged in the divided region 20a is connected to the series connection structure of same color LEDs arranged in the divided region 20b in parallel. For example, the series connection structure of the red color LEDs arranged in the divided region 20a is connected to the series connection structure of the red color LEDs arranged in the divided region 20b in parallel.

The parallel connection structure between the series connection structures of the identical color LEDs in the different divided regions is connected to the corresponding driving circuit 221, 222 or 223. Therefore, the LEDs are electrically connected to each other by the combination of the series and parallel connections.

As described above, the combination of the series and parallel electric connections for the LEDs can solve the high voltage problem, which may be caused when only the series connection structure is employed, and the high current problem, which may be caused when only the parallel connection structure is employed. That is, in this embodiment, by interconnecting the proper number of LEDs, which can driven by a proper voltage, in series and by interconnecting the proper number of series connections, that can be driven by a proper current, in parallel, the problems of the conventional LED connection structure requiring an excessive driving voltage or current can be solved.

In the combination of the series and parallel connections, it is preferable that the numbers of the red, green and blue LEDs are identical to each other so that the red, green and blue LED driving circuits 221, 222 and 223 of each LED driving unit 22 can be formed in an identical circuit.

In addition, it is preferable that the series connection of each of the red, green and blue LEDs 211, 212 and 213 in the divided region 20a is connected to the corresponding series connection of each of the red, green and blue LEDs 211, 212 and 213 in the divided region 20b in parallel. Particularly, it is preferable that each of the LED driving units 32 drives the LEDs arranged in two adjacent divided regions 20a and 20b.

Figure 4:
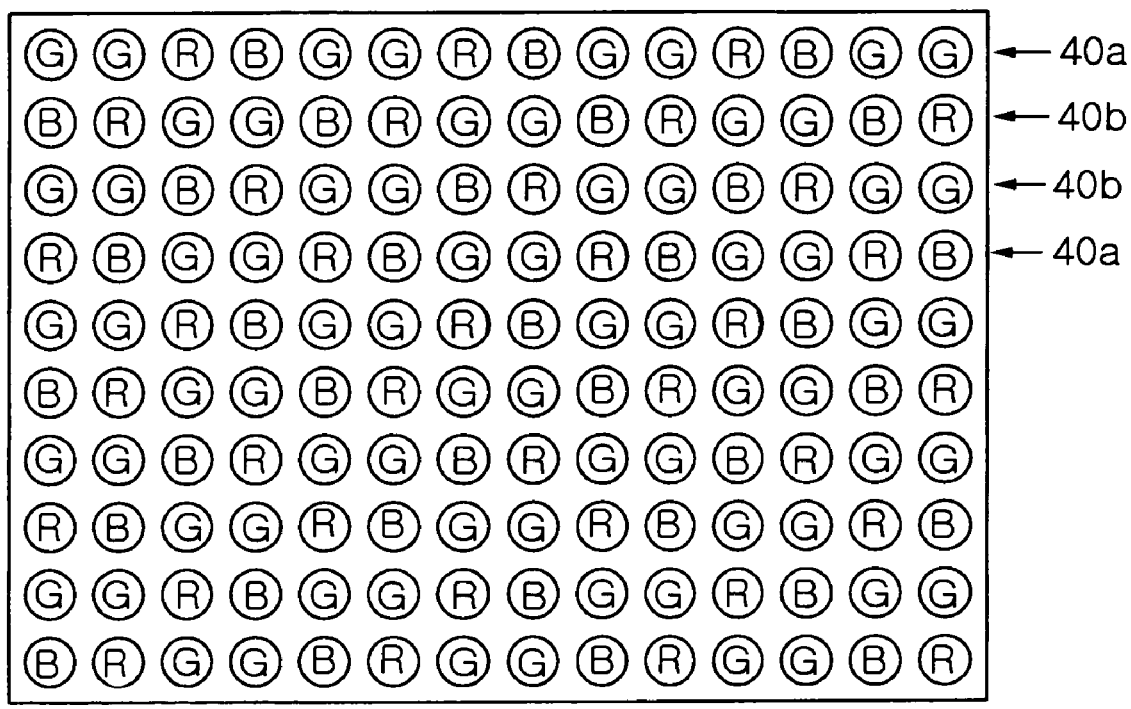
FIG. 4 is a schematic view of an arrangement of LEDs according to an embodiment of the present invention.

It is further preferable that the red, green and blue LEDs are arranged on the substrate such that the red, green and blue lights can be uniformly mixed. The arrangement of the LEDs for uniformly mixing the red, green and blue colors is disclosed in Korean patent application No. 10-2005-0045794 filed by the applicant of this application. FIG. 4 is a schematic view of an LED arrangement disclosed in the application. Referring to FIG. 4, the LED arrangement structure has a matrix structure where the LEDs are arranged along rows and columns. The matrix structure includes a first LED array where red, blue, green, and green LEDs are repeatedly arranged in this order and a second LED array 40b where blue, red, green, and green LEDs are repeatedly arranged in this order. The first LED arrays and the second LED arrays are repeatedly arranged along rows in order to arrange one red LED, one blue LED and two green LEDs repeatedly in this order along columns.

When the above-described LED arrangement structure is applied, the red, green and blue lights can be uniformly mixed. That is, the uniform white light without reddish or bluish light can be emitted even from the edge portions.

Referring again to FIG. 2, the LED driving unit 22 includes the red LED driving circuit 221, the green LED driving circuit 222, and the blue LED driving circuit 223. The LED driving circuits 221, 222 and 223 function to apply electric power to the LEDs while properly controlling a luminance, a color coordinate, or a color temperature to drive the LEDs under a desired condition. As the LED driving circuits 221, 222 and 223, a driving circuit disposed in Korean patent application Nos. 10-2005-0041525 and 10-2005-0041526 filed by the applicant of this application may be used.

The above-described surface light source can be applied to an LCD backlight unit 200 emitting light toward a rear surface of an LCD panel.

Figure 5:
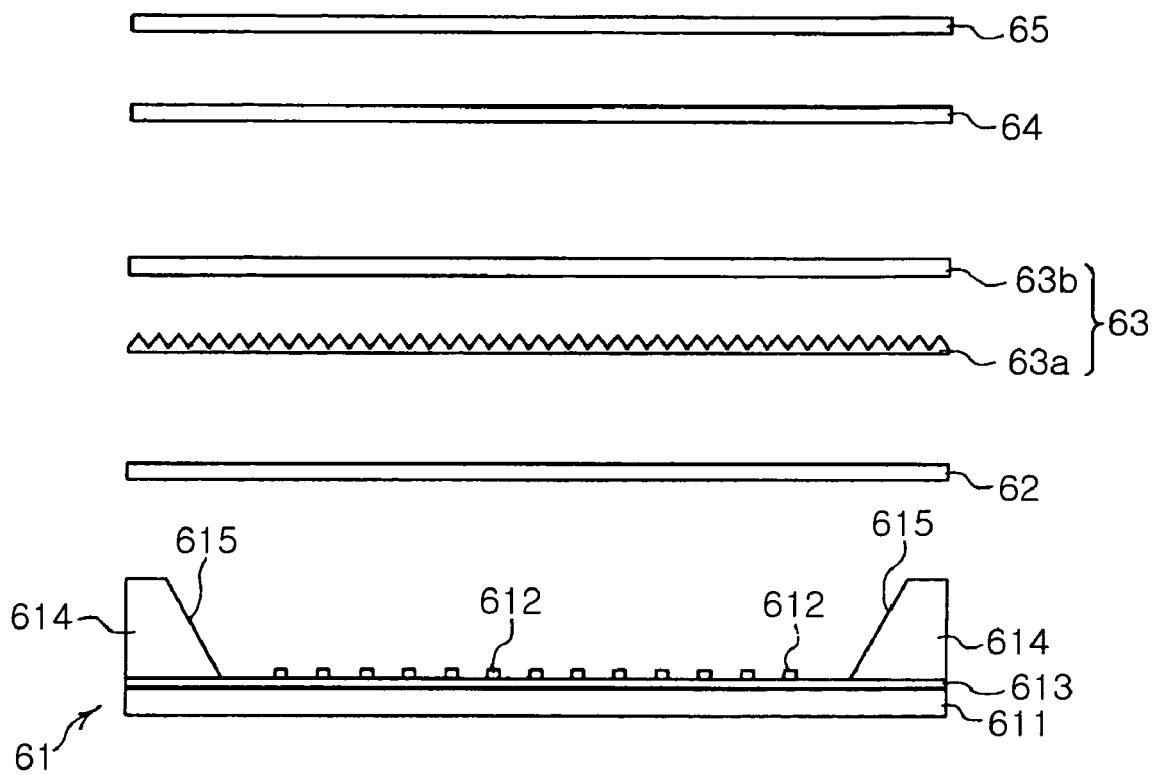
FIG. 5 is an exploded side view of a backlight unit for an LCD according to an embodiment of the present invention.

FIG. 5 is an exploded sectional view of an LCD backlight unit according to an embodiment of the present invention. As shown in FIG. 5, the LCD backlight unit attached on a rear surface of an LCD panel includes the surface light source 61 and a diffuser sheet 62 provided at an LCD panel side of the surface light source 61 to uniformly diffuse incident light from the surface light source 61. At least one light collection sheet 63 is provided at an LCD panel side of the diffuser sheet 62 to collect light diffused from the diffuser sheet 62 in a direction vertical to a plan of the LCD panel 65. A protective sheet 64 may be additionally disposed on the light collection sheet 63 to protect the optical structure.

In addition, the surface light source 61 further includes a substrate 611 and a plurality of LEDs 612 arranged in the above-described matrix structure according to the present invention. A sidewall 614 is formed on a top edge of the substrate 611 to surround the LEDs 612 arranged in the matrix structure. The sidewall 614 has an inclined surface facing the LEDs 612. A reflection layer 613 may be formed on a top surface of the substrate 611 to reflect the light emitted from the LEDs 612 upward.

A reflection material may be deposited on the inclined surface of the sidewall 614 to reflect the light emitted in a lateral direction upward.

The diffuser sheet 62 disposed above the surface light source 61 diffuses the incident light from the surface light source 1 to prevent the light from being locally concentrated. In addition, the diffuser sheet 61 controls a traveling direction of the light toward the first light collection sheet 63a to reduce the inclined angle to the first light collection sheet 63a.

The first and second light collection sheets 63a and 63b are provided at their top surfaces with a plurality of prisms arranged in a predetermined pattern. The prisms of the first light collection sheet 63a cross the prisms of the second light collection sheet 63b at a predetermined angle of about 90°. The first and second light collection sheets 63a and 63b function to collect the light diffused from the diffuser sheet 62 in a direction vertical to the plan of the LCD panel 65. Therefore, the light passing through the first and second light collection sheets 64a and 64b can incident on the protective sheet 64 in a direction normal to the surface of the protective sheet 64. As a result, since the light passing through the first and second light collection sheets 63a and 63b travels in a direction normal to the surface of the protective sheet 64, the luminance distribution on the protective sheet becomes uniform. In FIG. 5, although two light collection sheets are exampled, the present invention is not limited to this. That is, if required, only one light collection sheet can be provided.

The protective sheet 64 formed above the second light collection sheet 63b functions to not only protect the surface of the second light collection sheet 63b but also to diffuse the light to make the light distribution uniform. The LCD panel 65 is disposed on the protective sheet 64.

The surface light source using the LEDs is proper to be applied to the LCD backlight unit 200. In addition, the surface light source can properly control the driving voltage and current within a proper range by interconnecting the proper number of LEDs in series, by interconnecting the proper number of series connections in parallel, and by connecting the parallel connection to one driving circuit.

According to the present invention, by interconnecting the proper number of LEDs, which can driven by a proper voltage, in series and by interconnecting the proper number of series connections, that can be driven by a proper current, in parallel, the problems of the conventional LED connection structure requiring an excessive driving voltage or current can be solved and thus the LEDs can be driven by a proper driving voltage and current.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A surface light source using LEDs, comprising:
   a substrate having a plurality of divided regions;
   a plurality of red, green and blue LEDs arranged on each divided region in a predetermined arrangement structure; and
   a plurality of LED driving units each having red, green and blue LED driving circuits for respectively driving the red, green and blue LEDs,
   wherein the red, green and blue LEDs, arranged in one divided region, are connected to like-colored LEDs in series, the series connections being connected in parallel with like-colored LED series arranged in at least one other divided region,
   wherein the parallel connections of the like-colored LEDS in series are connected to corresponding color LED driving circuits, and
   wherein the predetermined arrangement structure comprises:

a first LED array where red, blue, green, and green LEDs are repeatedly arranged in this order; and a second LED array where blue, red, green, and green LEDs are repeatedly arranged in this order, wherein the first LED arrays and the second LED arrays are repeatedly arranged along rows in order to arrange groups of one red LED, one blue LED and two green LEDs along columns.

2. The surface light source of claim 1, wherein the substrate is divided such that the arrangement of the divided regions becomes nX2 or 2Xn (n is a natural number greater than 2).

3. The surface light source of claim 1, wherein the numbers of the red, green and blue LEDs in one divided region are identical to those of the red, green and blue LEDs in other divided regions.

4. The surface light source of claim 1, wherein the series connections of the red, green and blue LEDs in one divided region are respectively connected to the series connections of the red, green and blue LEDs in an adjacent divided region in parallel.

5. The surface light source of claim 1, wherein each of the LED driving unit drives the LEDs arranged in two adjacent divided regions.

6. A backlight unit attached on an LCD panel, comprising:
a surface light source according to any one of claims 1 through 5;
a diffuser sheet provided at a LCD panel side of the surface light source to uniformly diffuse incident light from the surface light source; and
at least one light collection sheet provided at an LCD panel side of the diffuser sheet to collecting diffused light from the diffuser sheet in a direction normal to a plan of the LCD panel.

7. A display device comprising:
a display panel; and
a backlight unit which emits light to the display panel, the backlight unit comprising:
a surface light source using LEDs, comprising:
a substrate having a plurality of divided regions;
a plurality of red, green and blue LEDs arranged on each divided region in a predetermined arrangement structure; and
a plurality of LED driving units each having red, green and blue LED driving circuits for respectively driving the red, green and blue LEDs,
wherein the red, green and blue LEDs, arranged in one divided region, are connected to like-colored LEDs in series, the series connections being connected in parallel with like-colored LED series arranged in at least one other divided region,
wherein the parallel connections of the like-colored LEDS in series are connected to corresponding color LED driving circuits, and
wherein the predetermined arrangement structure comprises:
a first LED array where red, blue, green, and green LEDs are repeatedly arranged in this order; and
a second LED array where blue, red, green, and green LEDs are repeatedly arranged in this order,
wherein the first LED arrays and the second LED arrays are repeatedly arranged along rows in order to arrange groups of one red LED, one blue LED and two green LEDs along columns.

8. The display device of claim 7, wherein the display panel is a liquid crystal panel.

9. A television comprising the display device of claim 7.

10. The television of claim 9, wherein the display panel is a liquid crystal panel.

* * * * *